United States Patent [19]
Zwarun et al.

[11] Patent Number: 4,880,466
[45] Date of Patent: Nov. 14, 1989

[54] INK FORMULATION FOR MONITORING STERILIZATION PROCESSES

[75] Inventors: Andrew A. Zwarun, Roslyn Heights; Gail L. Price, Ridge, both of N.Y.

[73] Assignee: Edward Weck Incorporated, Princeton, N.J.

[21] Appl. No.: 206,948

[22] Filed: Jun. 9, 1988

Related U.S. Application Data

[63] Continuation of Ser. No. 945,402, Dec. 22, 1986, abandoned.

[51] Int. Cl.$^4$ .............................................. C09D 11/00
[52] U.S. Cl. ........................................ 106/21; 106/26; 427/151
[58] Field of Search ................. 106/21, 26; 252/408.1; 427/151

[56] References Cited

U.S. PATENT DOCUMENTS

| | | | |
|---|---|---|---|
| 3,471,422 | 10/1969 | Edlein | 436/1 |
| 3,627,469 | 12/1971 | Cheng | 436/1 |
| 3,883,438 | 5/1975 | Remer | 252/1 |
| 4,094,642 | 6/1978 | Sumimoto et al. | 23/254 R |

*Primary Examiner*—Amelia Burgess Yarbrough
*Attorney, Agent, or Firm*—Donald J. Barrack; Robert E. Lee, Jr.

[57] ABSTRACT

In accordance with the present invention an ink formulation capable of monitoring steam, dry heat and ethylene oxide gas sterilization processes is disclosed. The formulation comprises selected substituted pyridenes, quinolines or isoquinolines as the active compound in combination with a nitrocellulose solution and a solvent.

8 Claims, No Drawings

INK FORMULATION FOR MONITORING STERILIZATION PROCESSES

This is a continuation of co-pending application Ser. No. 945,402 filed on Dec. 22, 1986, abandoned.

FIELD OF THE INVENTION

The present invention relates to an ink formulation for use as a sterilization monitor, and more particularly concerns such a formulation capable of monitoring dry heat, steam and ethylene oxide gas sterilization processes.

BACKGROUND OF THE INVENTION

In hospital and laboratory settings, there are three primary methods of sterilization currently used. These are steam sterilization, ethylene oxide gas sterilization, and dry heat sterilization. It is well known to apply sterilant-sensitive inks to the package or article to be sterilized so that the end user can readily determine whether or not the package has been exposed to the sterilization process. Some inks indicate exposure only, while others are capable of indicating the degree of sterilization, i.e. whether or not the package has been sufficiently exposed.

For the steam sterilization process a typical ink monitor formulation comprises sulfur (or a sulfur-containing compound), a metal salt and a solvent into which the first two components are suspended. While this type of formulation is suitable for steam processes which may be carried out from between about 250° F. and 270° F., it is not sensitive to the ethylene oxide gas sterilization process.

U.S. Pat. No. 3,627,469 discloses ink formulations comprising selected substituted pyridenes, quinolines and isoquinolines useful as exposure and sterilization monitors. These compounds are typically dissolved or suspended in organic solvents and have been found to be sensitive to ethylene oxide gas and dry heat sterilization processes as both exposure and sterilization monitors. These formulations are not, however, sensitive to steam sterilization processes.

An ink formulation suitable as a sterilization monitor for steam, ethylene oxide and dry heat sterilization methods would be a useful addition to the art.

SUMMARY OF THE INVENTION

In accordance with the present invention an ink formulation capable of monitoring steam, dry heat and ethylene oxide gas sterilization processes is disclosed. The formulation comprises selected substituted pyridenes, quinolines or isoquinolines as the active compound in combination with a nitrocellulose solution and a solvent.

DETAILED DESCRIPTION OF THE INVENTION

The ink formulation of the present invention comprises a nitrocellulose solution as a binder, a solvent and an active compound as described in U.S. Pat. No. 3,627,469, which is incorporated herein by reference. The present formulation has universal utility in that it is capable of monitoring steam, dry heat and ethylene oxide gas sterilization processes. In fact, the ink is an off white color prior to sterilization process and turns to brown after sterilization is complete, regardless of the process employed. Therefore, the user need not be aware of various color changes for various inks and processes as in the prior art, but can enjoy the convenience of knowing that if the monitor is brown, the contents have been sterilized.

The nitrocellulose solution serves as a binder for the present ink formulation. Although this is a known binder, its combination with the selected substituted pyridenes, quinolines and isoquinolines described in U.S. Pat. No. 3,627,469, has not been heretofore disclosed. Further, that this combination would provide monitor sensitivity to all three primary sterilization processes, i.e. steam, dry heat and ethylene oxide gas, was unexpected. In fact, numerous other prior art binders were tried in combination with the active compounds of the present formulation with unsatisfactory results.

The nitrocellulose solution comprises nitrocellulose (which is essentially a variable mixture of cellulose nitrates, the most predominant of which is cellulose tetranitrate) in solution with one or more solvents, for example, ethyl acetate and cellosolve acetate. The nitrocellulose solution, typically comprising equal parts by weight of nitrocellulose, ethyl acetate and cellusolve acetate, should be present in an amount between about 20 and 80 volume percent and preferably between about 40 and 60 volume percent of the total formulation.

The solvent of the present formulation can be any solvent capable of dissolving the desired active compound and preferably should evaporate rapidly. Preferred solvents include ethyl acetate, acetone, ethanol, and methylethyl ketone. The solvent should be present in an amount between about 10 and 75 volume percent and preferably between about 45 and 50 volume percent of the total formulation.

The active compounds of the present formulation, as described in U.S. Pat. No. 3,627,469, are selected from the group consisting of

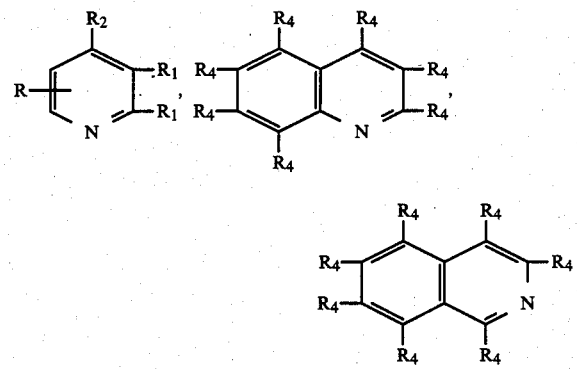

and salts thereof, wherein $R_1$ and $R_2$ are independently selected from the group consisting of hydrogen.

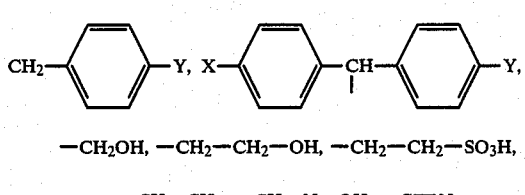

$-CH_2OH$, $-CH_2-CH_2-OH$, $-CH_2-CH_2-SO_3H$, $-CH=CH_2$, $-CH=N-OH$, $-C\equiv N$,

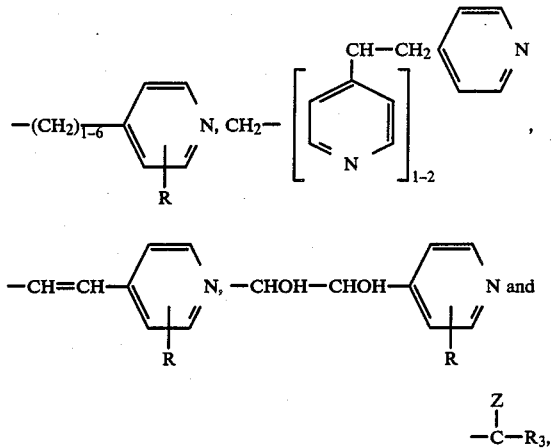

with the proviso that at least one, but not more than two of $R_1$ and $R_2$ are hydrogen; R is hydrogen, halogen or alkyl; X is hydrogen, —N=O, —NO$_2$, —OH, —SH, —CH=N—OH, alkyl or haogen; Y is hydrogen, —N=O, —OH, —SH, —CH=N—OH, alkyl or halogen, Z is oxygen or sulfur; $R_3$ is —OH, —NH$_2$, —NH—NH$_2$ or alkoxy; at least one of the $R_4$ groups is —OH, —SH or —CH=N—OH, and the other $R_4$ groups are hydrogen.

Preferred active compounds include 1,2-bis-(4-pyridyl)-ethylene, 1,2-bis-(4-pyridyl)-ethane, benzyl pyridine, 5-hydroxy isoquinoline and 3-pyridylcarbinol. Preferably the active compound is in solution with a second solvent, i.e. distinct from the above-mentioned solvents, which may be ethanol or the like. This active compound solution should have a weight ratio of between about 1:7 and about 1:10 of the active compound to the second solvent. This active compound solution should be present in an amount between about 5 and 60 volume percent and preferably between about 10 and 20 volume percent of the total formulation.

A preferred ink formulation in accordance with the present invention comprises an active compound solution consisting of 1,2-bis-(4-pyridyl)ethylene or 5-hydroxy isoquinone in ethanol, the nitrocellulose solution consisting of nitrocellulose in combination with ethyl acetate and cellosolve acetate, and, acetone or methylethyl ketone as the formulation solvent.

To make the formulation of the present invention the nitrocellulose solution is first made by heating and dissolving the appropriate amount of nitrocellulose in a mixture of, for example, ethyl acetate and cellosolve acetate. Secondly, the active compound solution is prepared by dissolving an appropriate amount of the desired active compound, e.g. 1,2-bis-(4-pyridyl)-ethylene in, for example, ethanol. Appropriate amounts of these so-formed solutions are then combined with the solvent to complete the formulation.

The formulation can be applied to a package in any convenient manner, such as rotegraveure, stamping, spraying and the like.

The following working examples represent specific embodiments of the present invention, however, the scope of the present invention is not meant to be limited by the details described therein.

EXAMPLE 1

1,2-bis-(4-Pyridyl)-ethene Ink Formulation

A. Nitrocellulose Solution

A nitrocellulose solution was prepared by first adding 20 ml of ethyl acetate to 20 ml of cellosolve acetate and gently heating the so-formed mixture until warm. Nitrocellulose (15 g, SS ½ grade) was added and dissolved into the solvents forming the nitrocellulose solution.

B. Active Compound Solution 1,2-bis-(4-Pyridyl)-ethylene (2 g; the preparation of which is described in U.S. Pat. No. 3,627,469) was added to 18 ml of ethanol and dissolved therein.

C. 1,2-bis-(4-Pyridyl)-ethylene Ink Formulation 4 ml of the nitrocellulose solution of part A, 1 ml of the active compound solution of part B, and 3 ml of the ethyl acetate were mixed together to form the title ink formulation.

The so-formed ink was applied to several samples of a standard sterilization wrap and subjected to various sterilization processes, the operating parameters of which are listed below.

SATURATED STEAM: 250° F. 3 to 30 minutes 270° F. 4 minutes

ETHYLENE OXIDE: 20 minutes to 2 hours exposure to about 650 mg/liter of 88:12 Freon to EO mixture DRY HEAT: 250 ° F. 1 to 10 minutes This formulation was found to be sensitive to steam, dry heat and ethylene oxide gas sterilization.

EXAMPLES 2 TO 5

Ink formulations were prepared as in Example 1 except that the active compounds listed below were substituted for the active compound of Example 1.

| Ex. No. | Active Compound | Sensitivity of Formulation to Sterilization | | |
|---|---|---|---|---|
| | | Steam | Dry Heat | Ethylene Oxide |
| 2 | 1,2-bis-(4-pyridyl)-ethane | yes | yes | yes |
| 3 | benzyl pyridene | yes | yes | yes |
| 4 | 5-hydroxy isoquinoline | yes | yes | yes |
| 5 | 3-pyridylcarbinol | yes | yes | yes |

EXAMPLES 6 TO 8

Ink formulations were prepared as in Example 1 except that the solvents listed below were substituted for the solvent of Example 1.

| Ex. No. | Solvent | Sensitivity of Formulation to Sterilization | | |
|---|---|---|---|---|
| | | Steam | Dry Heat | Ethylene Oxide |
| 6 | acetone | yes | yes | yes |
| 7 | ethanol | yes | yes | yes |
| 8 | methylethyl ketone | yes | yes | yes |

EXAMPLES 9 TO 12

Ink formulations were prepared as in Example 1 except that the binders listed below were substituted for the binder of Example 1.

| Ex. No. | Binder | Sensitivity of Formulation to Sterilization | | |
|---|---|---|---|---|
| | | Steam | Dry Heat | Ethylene Oxide |
| 9 | Butyl methacrylate resin (Elvacite 2044 by DuPont) | no | no | no |
| 10 | Varnish (W-424 Roberts & Carlson, Inc.) | no | no | no |
| 11 | Alkyl resin 3503 (Superior Varnish & Dryer Company) | no | no | no |
| 12 | Polyurethane resin (Minwax Co., Inc.) | yes | no | no |

What is claimed is:

1. In an ink formulation for monitoring a steam sterilization process, said formulation comprising an active compound selected from the group consisting of

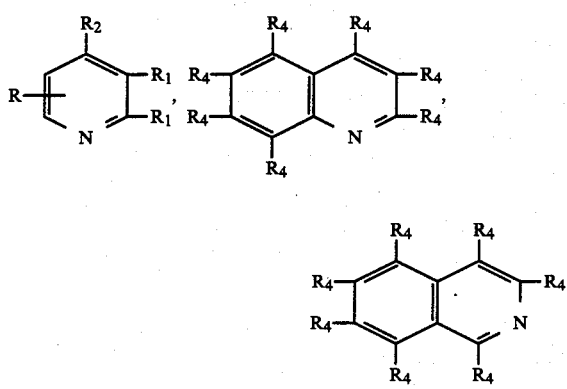

and salts thereof, wherein $R_1$ and $R_2$ are independently selected from the group consisting of hydrogen,

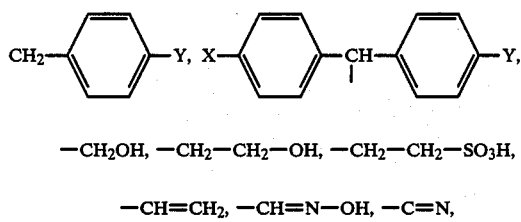

—CH$_2$OH, —CH$_2$—CH$_2$—OH, —CH$_2$—CH$_2$—SO$_3$H,

—CH=CH$_2$, —CH=N—OH, —C≡N,

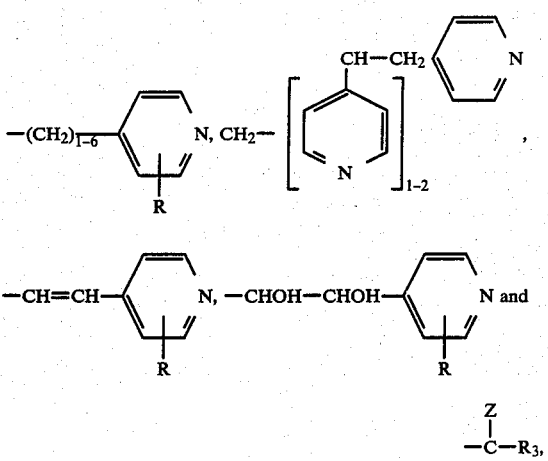

with the proviso that at least one, but not more than two of $R_1$ and $R_2$ are hydrogen; R is hydrogen, halogen or alkyl; X is hydrogen, —N=O, —NO$_2$, —OH, —SH, —CH=N—OH, alkyl or halogen; Y is hydrogen, —N=O, —OH, —SH, —CH=N—OH, alkyl or halogen, Z is oxygen or sulfur; $R_3$ is —OH, —NH$_2$, —NH—NH$_2$ or alkoxy; at least one of the $R_4$ groups is —OH, —SH or —CH=N—OH, and the other $R_4$ groups are hydrogen;

the improvement wherein said ink further comprises a nitrocellulose solution and a solvent.

2. The ink of claim 1 wherein said active compound is selected from the group consisting of 1,2-bis-(4-pyridyl)-ethylene, 1,2-bis-(4-pyridyl)-ethane, benzyl pyridine, 5-hydroxy isoquinoline, and 3-pyridylcarbinol.

3. The ink of claim 2 wherein said active compound is 1,2-bis-(4-pyridyl)-ethylene.

4. The ink of claim 1 wherein said solvent is selected from the group consisting of ethyl acetate, acetone, thanol, and methylethyl ketone.

5. The ink of claim 4 wherein said solvent is ethyl acetate.

6. The ink of claim 1 wherein the active compound is in solution with a second solvent in a weight ratio of between about 1:7 and 1:10 of the compound to the second solvent.

7. The ink of claim 6 comprising between about 20 and 80 volume percent of nitrocellulose solution, between about 5 and 60 volume percent of active compound solution and between about 10 and 75 volume percent of solvent.

8. The ink of claim 6 comprising between about 40 and 60 volume percent of nitrocellulose solution, between about 10 and 20 volume percent of active compound solution and between about 45 and 50 volume percent of solvent.